United States Patent [19]
Tsai

[11] Patent Number: 5,462,769
[45] Date of Patent: * Oct. 31, 1995

[54] METHOD FOR COATING METAL COOKWARE

[76] Inventor: Tung-Hung Tsai, No. 20, Lane 104, Ta-Liao Rd., Ta-Liao Tsun, Ta-Liao Hsiang, Kaohsiung Hsien, Taiwan

[ * ] Notice: The portion of the term of this patent subsequent to May 2, 2012, has been disclaimed.

[21] Appl. No.: 365,917

[22] Filed: Dec. 29, 1994

Related U.S. Application Data

[63] Continuation-in-part of Ser. No. 55,680, Apr. 29, 1993, Pat. No. 5,411,771.

[51] Int. Cl.⁶ .................................................. B05D 3/04
[52] U.S. Cl. ........................ 427/307; 427/328; 427/409
[58] Field of Search .................................. 427/307, 409, 427/328

[56] References Cited

U.S. PATENT DOCUMENTS

| | | | |
|---|---|---|---|
| 3,900,684 | 8/1975 | Edwards | 428/421 |
| 4,070,325 | 1/1978 | Vassiliou | 428/422 |
| 4,196,256 | 4/1980 | Eddy | 428/422 |
| 4,252,859 | 2/1989 | Conrannon | 428/422 |
| 4,395,445 | 2/1989 | Gebayer | 427/407 |
| 4,568,573 | 2/1989 | Sunade | 427/350 |
| 4,683,168 | 7/1989 | Hares | 428/335 |
| 4,808,490 | 2/1989 | Tsukuda | 428/696 |
| 4,862,609 | 9/1989 | Ulrich | 38/93 |

*Primary Examiner*—Bernard Pianalto
*Attorney, Agent, or Firm*—Ladas & Parry

[57] ABSTRACT

A method of coating a metal cookware having a cooking surface includes the steps of: (A) roughening and cleaning the cooking surface of the metal cookware; (B) applying a metallic scratch-resistant layer onto the roughened and cleaned cooking surface; and (C) applying an anti-stick layer onto the scratch-resistant layer, whereby the anti-stick layer has a roughness of about 2.5–5.5 μm, a thickness of about 23–36 μm and a pencil hardness of about 8–9 H, the anti-stick layer consisting essentially of polytetrafluoroethylene (PTFE) and perfluoroalkoxy polymers (PFA), the ratio of PTFE to PFA ranging from 55:45 to 60:40.

2 Claims, 3 Drawing Sheets

5,462,769

METHOD FOR COATING METAL COOKWARE

CROSS-REFERENCE TO RELATED APPLICATION

This application is a continuation-in-part (CIP) of U.S. patent application No. 08/055,680, filed on Apr. 29, 1993 by the applicant, now U.S. Pat. No. 5,411,771.

BACKGROUND OF THE INVENTION

1. Field of the Invention

This invention relates to a method for coating a metal cookware, more particularly to a method for coating a metal cookware in order to provide an improved anti-stick layer on a cooking surface thereof so as to enable the metal cookware to have a relatively long service life.

2. Description of Related Art

U.S. patent application No. 08/055,680 discloses a method for coating a metal cookware so as to provide a scratch-resistant and anti-stick cooking surface thereto. The method includes the steps of: (a) roughening and cleaning a cooking surface of the metal cookware by blasting aluminum oxide particles against the cooking surface; (b) applying a metallic scratch-resistant layer onto the roughened and cleaned cooking surface by electric-arc spraying; and (c) applying an anti-stick layer, consisting essentially of polytetrafluoroethylene (PTFE), onto the scratch-resistant layer by spray coating until the anti-stick layer has a thickness of about 23–36 μm, whereby a pencil hardness of 8–9 H is achieved.

Although the metal cookware which is coated as such has a scratch-resistant and anti-stick cooking surface, it has been found that the cooking surface rusts easily. This is due to the fact that PTFE has a crystallinity of over 99%, which tends to create pores and cleavages in the anti-stick layer after a sintering process, thereby exposing the metallic scratch-resistant layer to the atmosphere. Thus, the coated metal cookware cannot have a very long service life.

There are other prior art references concerning the technique of preparing and applying PTFE coatings. Examples of them are U.S. Pat. Nos. 3,900,684, 4,070,525, 4,196,256, 4,252,859, 4,395,445, 4,568,573, 4,618,511, 4,683,168, 4,702,933, 4,808,490 and 4,862,609.

SUMMARY OF THE INVENTION

The objective of this invention is to provide a method for coating a metal cookware in order to provide an improved anti-stick layer on a cooking surface thereof so as to enable the metal cookware to have a longer service life when compared to the previously described coated metal cookware.

According to this invention, the method of coating a metal cookware having a cooking surface includes the steps of: (A) roughening and cleaning the cooking surface of the metal cookware; (B) applying a metallic scratch-resistant layer onto the roughened and cleaned cooking surface; and (C) applying an anti-stick layer onto the scratch-resistant layer, whereby the anti-stick layer has a roughness of about 2.5–5.5 μm, a thickness of about 23–36 μm and a pencil hardness of about 8–9 H, the anti-stick layer consisting essentially of polytetrafluoroethylene (PTFE) and perfluoroalkoxy polymers (PFA), the ratio of PTFE to PFA ranging from 55:45 to 60:40.

The step (C) in this method may include the steps of: (C1) applying a first coating, which consists essentially of PTFE and PFA, onto the scratch-resistant layer until the first coating has a thickness of about 5–10 μm, the ratio of PTFE to PFA ranging from 55:45 to 60:40; (C2) applying a second coating, which consists essentially of PTFE and PFA, onto the first coating until the second coating has a thickness of about 15–20 μm, the ratio of PTFE to PFA being about 55:45; and (C3) applying a third coating, which consists essentially of PTFE and PFA, onto the second coating until the third coating has a thickness of about 3–6 μm, the ratio of PTFE to PFA being about 55:45.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
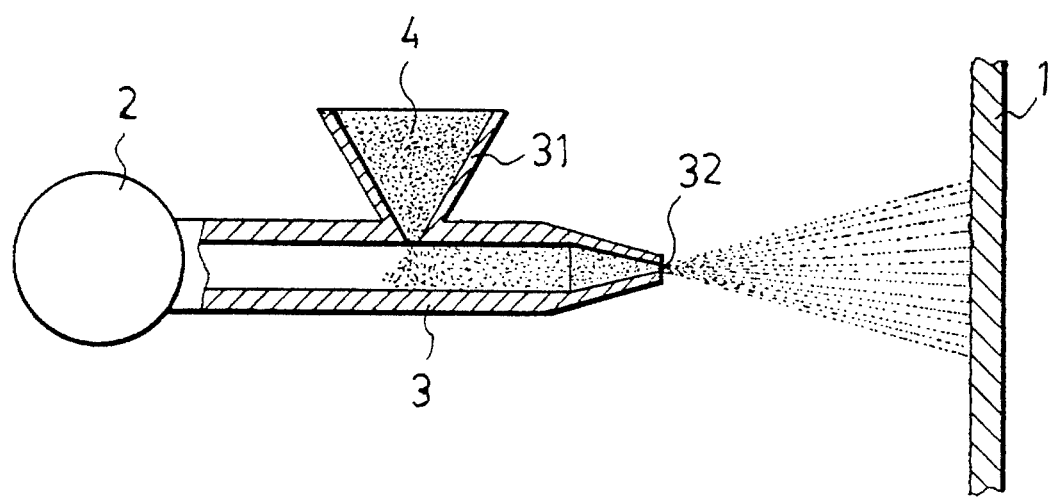
FIG. 1 shows aluminum oxide particles blasted against a cooking surface of a metal cookware to roughen and clean the cooking surface.

Before the present invention is described in greater detail, it should be noted that like elements are indicated by the same reference numerals throughout the disclosure.

A cast metal cookware 1, which may be made of copper, aluminum, iron or stainless steel, is provided and has a cooking surface. Referring to FIG. 1, fine aluminum oxide particles 4 of 60–80 mesh are contained in a funnel 31 which is connected to a nozzle 3. The nozzle 3 is connected to a device 2 containing compressed gas therein. The pressure of the compressed gas is about 5–8 kg/cm$^2$. The metal cookware 1 is located at a proper distance from a nozzle exit 32 of the nozzle 3. The aluminum oxide particles 4 are propelled through the nozzle 3 by the compressed gas onto the cooking surface in order to roughen and clean the cooking surface. The roughened and cleaned cooking surface has an average roughness of Ra 4.5–5.5 μm. The cooking surface is toughened and cleaned so as to facilitate the attachment and bonding of a further coating thereon.

Figure 2:
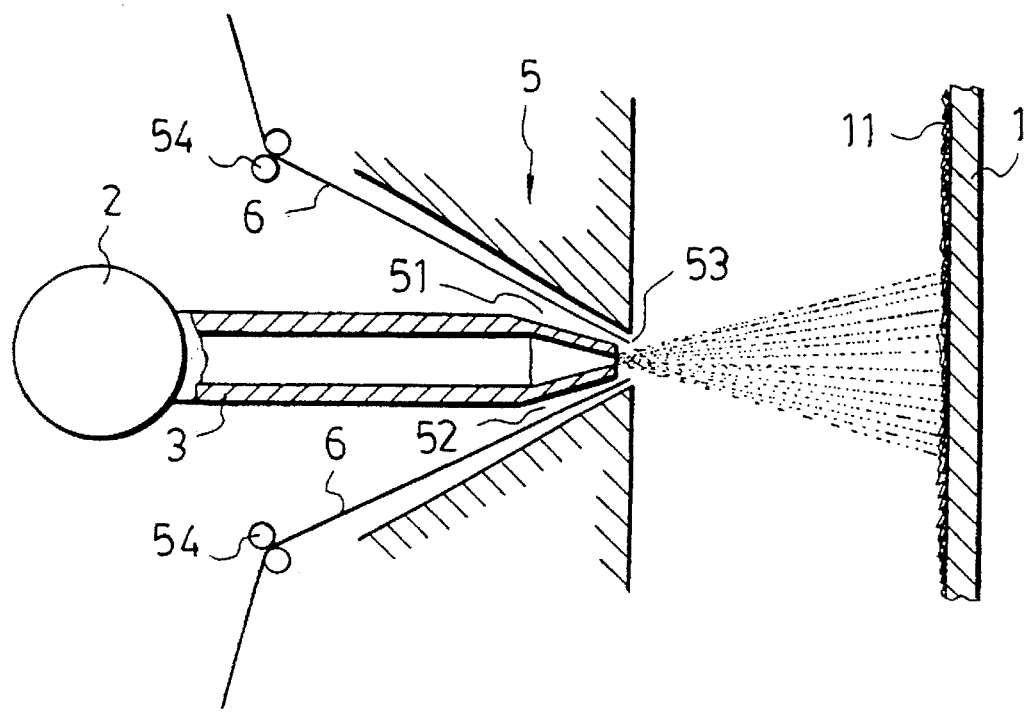
FIG. 2 shows a metallic scratch-resistant layer applied onto the roughened and cleaned cooking surface in FIG. 1.

FIG. 2 shows a scratch-resistant layer 11 applied onto the roughened and cleaned cooking surface by electric-arc spraying. The scratch-resistant layer 11 can be made of a metallic material which has a melting temperature of about 4500° C. Appropriate metallic materials include copper, zinc, nickel, chromium, aluminum, carbon steel and other stainless steels. An electric arc device 5 is mounted adjacent to the nozzle 3 and is conducted at a temperature of 4500°–8000° C., under a pressure of 5–8 kg/cm$^2$, and using a voltage of 30–40 V and a direct current of 100–300 A. Two metal wires 6 are respectively fed, by means of two roller devices 54, into the electric arc device 5 along two passages 51, 52 toward an opening 53. It is noted that the metal cookware 1 is located from the opening 53 at a distance of about 20–50 cm. The metal wires 6 are melted by means of the electric arc device 5 and are propelled by the compressed gas in the device 2 so as to be sprayed onto the roughened and cleaned cooking surface at a speed of about 100–300 m/sec, thus forming the scratch-resistant layer 11. The hot melted metal wires 6 cool at a rate of 1,000,000 DGE/° F./sec while they are sprayed onto the roughened and cleaned cooking surface from the opening 53. The scratch-resistant layer 11 is formed on the roughened and cleaned cooking surface at a temperature of between 60° C. and 150° C. so as to prevent the deformation of the metal cookware 1. Thus, even if a thin metal cookware is used, deformation will not occur. The scratch-resistant layer 11 formed on the cooking surface has a thickness preferably of about 40–90 µm and an average roughness of about 5.0–8.0 µm (Ra) and exhibits increased hardness. The temperature required for the electric arc heating is dependent on the material used for the scratch-resistant layer 11.

Figure 3:
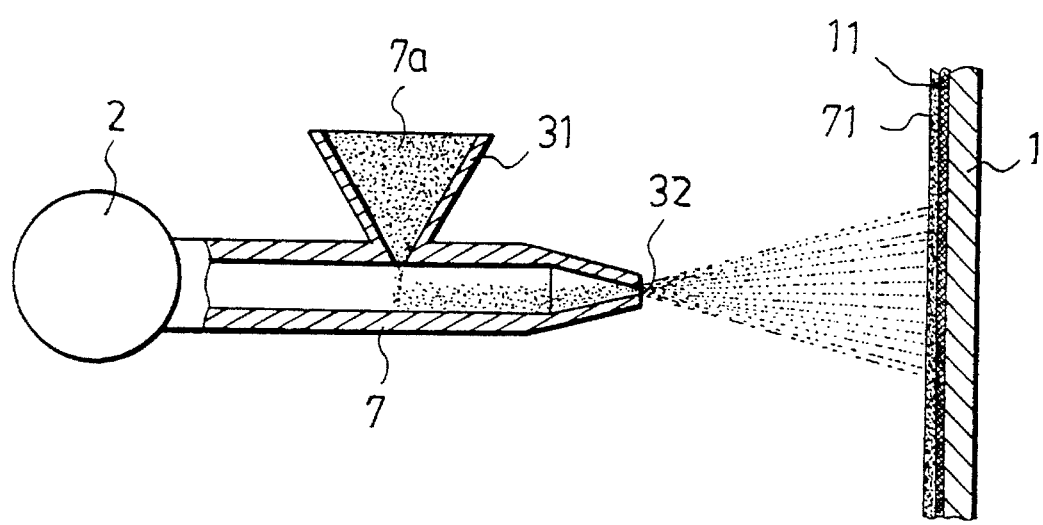
FIG. 3 shows a first coating of an anti-stick layer applied over the scratch-resistant layer in FIG. 2.
Figure 4:
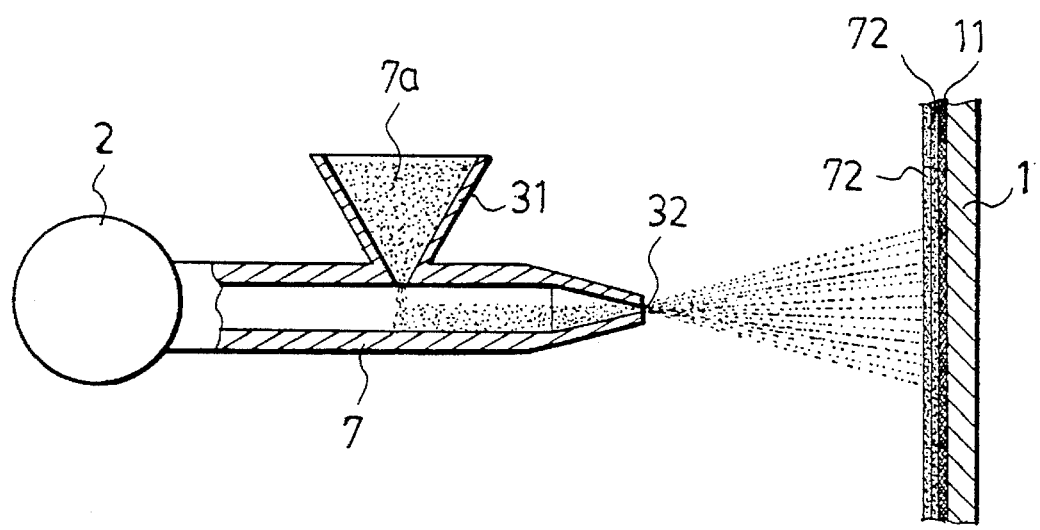
FIG. 4 shows a second coating of the anti-stick layer applied on the first coating in FIG. 3.
Figure 5:
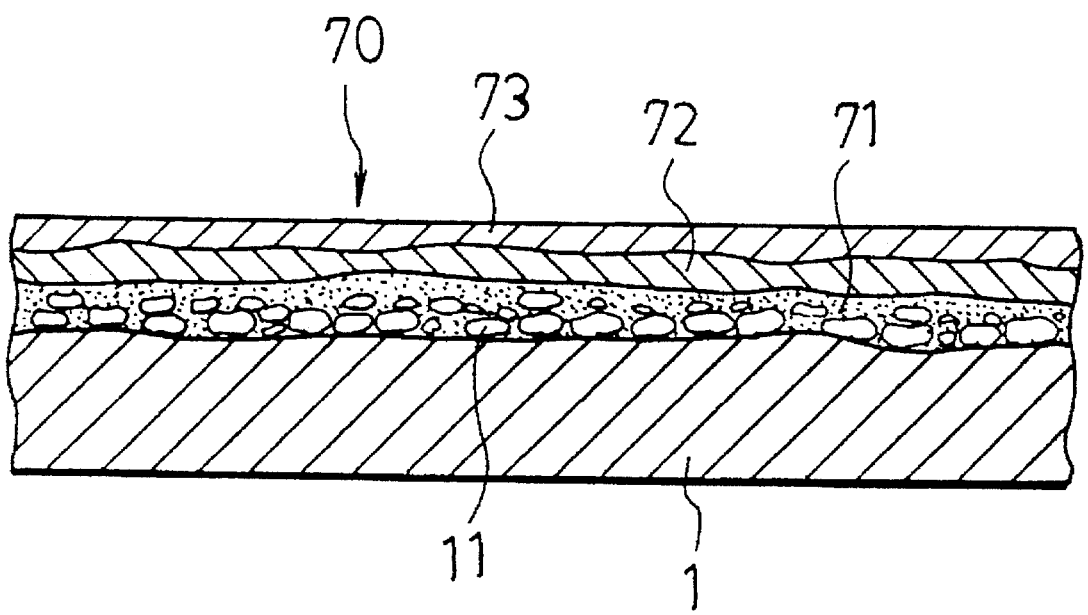
FIG. 5 is a schematic sectional view of the metal cookware coated in accordance with the method of this invention.

FIGS. 3 to 5 show an anti-stick layer 70 applied over the scratch-resistant layer 11 by a known spray coating technique. The anti-stick layer 70 includes a first coating 71, a second coating 72 and a third coating 73. The first coating composition contains fluorocarbon resin comprising perfluoroalkoxy polymers (PFA) and polytetrafluoroethylene (PTFE), a binder resin, a pigment, a surface active agent and a solvent such as water. PFA, PTFE, the binder resin, the pigment and the surface active agent together account for 26–42% of the weight of the first coating composition. The ratio of PTFE to PFA ranges from 55:45 to 60:40. The second coating composition contains PFA, PTFE, the pigment, the surface active agent and the solvent. PFA, PTFE, the pigment and the surface active agent together account for about 40–50% of the weight of the second coating composition. The ratio of PTFE to PFA is about 55:45. The third coating composition contains PFA, PTFE, the surface active agent and the solvent. PFA, PTFE and the surface active agent together account for less than 60% of the weight of the third coating composition. The ratio of PTFE to PFA is about 55:45. The fluorocarbon resin comprising PFA and PTFE in the first, second and third coatings 71, 72, 73 is in the majority with respect to the binder resin, the pigment and the surface active agent, respectively. The amount of the binder resin is approximately ⅓ or less of the amount of the fluorocarbon resin.

Referring to FIG. 3, the composition 7 of the first coating 71 is received via the funnel 31 and is propelled by the compressed gas in the device 2 through the nozzle 3 so as to be sprayed onto the scratch-resistant layer 11 which is already provided on the cooking surface of the metal cookware 1. At this point, the cooking surface is heated to a temperature of 90°–150° C. for 5–10 minutes to dry the first coating 71 sprayed thereon. The thickness of the first coating 71 is about 5–10 µm.

Referring to FIG. 4, the composition (7a) of the second coating 72 is received via the funnel 31 and is propelled by the compressed gas in the containing device 2 through the nozzle 3 so as to be sprayed onto the first coating 71 which is already provided on the cooking surface of the metal cookware 1. At this point, the cooking surface is heated to a temperature of about 95°–100° C. for 5–10 minutes to dry the second coating 72. The thickness of the second coating 72 formed on the cooking surface is about 15–20 µm.

Referring to FIG. 5, the third coating composition is sprayed onto the second coating 72 already on the cooking surface. At this point, the cooking surface is heated to a temperature of 400°–420° C. for 3–5 minutes to dry the third coating 73 sprayed thereon. The thickness of the third coating 73 is about 3–6 µm. The resultant thickness of the anti-stick layer 70, which includes the first, second and third coatings 71, 72, 73, is about 23–36 µm. The fluorocarbon resin, which comprises PTFE and PFA, in the composition of the anti-stick layer is sprayed over the scratch-resistant layer 11 and fills valleys formed on the surface of the scratch-resistant layer 11. The provision of the scratch-resistant layer 11 facilitates the attachment and bonding of the anti-stick layer 70 and increases the hardness of the resultant cooking surface of the metal cookware 1. Furthermore, the anti-stick layer 70 may be formed by spraying from one to five times.

According to the above described coating method, the resultant cooking surface of the metal cookware 1 has an average roughness of 2.5–5.5 µm (Ra) and a pencil hardness of 8–9 H due to the provision of both the scratch-resistant layer 11 and the anti-stick layer 70. Thus, the coated cooking surface has a good non-stick characteristic while maintaining a high level of hardness. Therefore, a metal cookware which is treated with the method of this invention can be non-stick so as to be easily cleaned and is unlikely to be abraded.

The PFA has a crystallinity of about 40–90%, which is lower than that of PTFE. By the use of the mixture of PFA and PTFE, the pores and cleavages within the anti-stick layer 70 can be minimized. Thus, the metallic scratch-resistant layer 11 located under the anti-stick layer 70 can be prevented from rusting. The coated metal cookware according to this invention can therefore have a relatively long service life when compared to the previously described coated metal cook ware.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method of coating a metal cookware having a cooking surface, comprising the steps of:

(A) roughening and cleaning said cooking surface of said metal cookware;

(B) applying a metallic scratch-resistant layer onto the roughened and cleaned cooking surface; and (C) applying an anti-stick layer onto the scratch-resistant layer, whereby the anti-stick layer has a roughness of about 2.5–5.5 µm, a thickness of about 23–36 µm and a pencil hardness of about 8–9 H, said anti-stick layer consisting essentially of polytetrafluoroethylene (PTFE) and perfluoroalkoxy polymers (PFA), the ratio of PTFE to PFA ranging from 55:45 to 60:40.

2. The coating method as claimed in claim 1, wherein the step (C) includes: (C1) applying a first coating, which consists essentially of PTFE and PFA, onto said scratch-resistant layer until said first coating has a thickness of about 5–10 µm, the ratio of PTFE to PFA ranging from 55:45 to 60:40; (C2) applying a second coating, which consists essentially of PTFE and PFA, onto said first coating until said second coating has a thickness of about 15–20 µm, the ratio of PTFE to PFA being about 55:45; and (C3) applying a third coating, which consists essentially of PTFE and PFA, onto said second coating until said third coating has a thickness of about 3–6 µm, the ratio of PTFE to PFA being about 55:45.

* * * * *